Nov. 12, 1940.   H. V. HOLMAN   2,221,326
PROTECTIVE DEVICE FOR CLAMP SCREWS
Filed Nov. 25, 1938
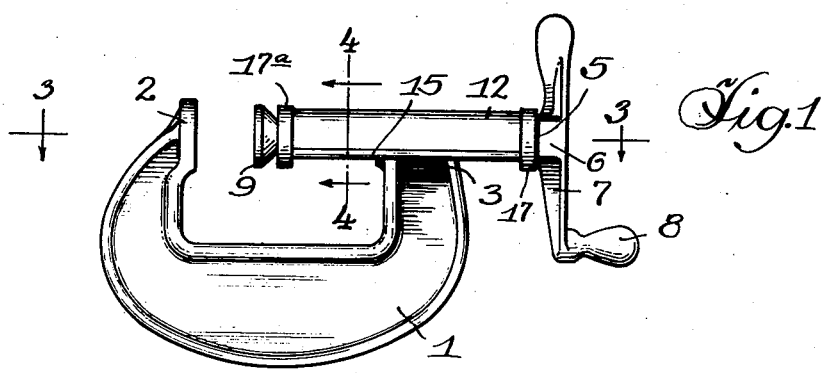
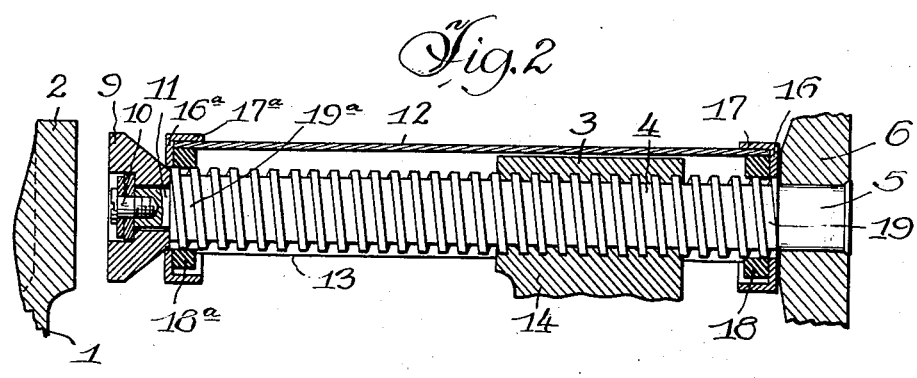
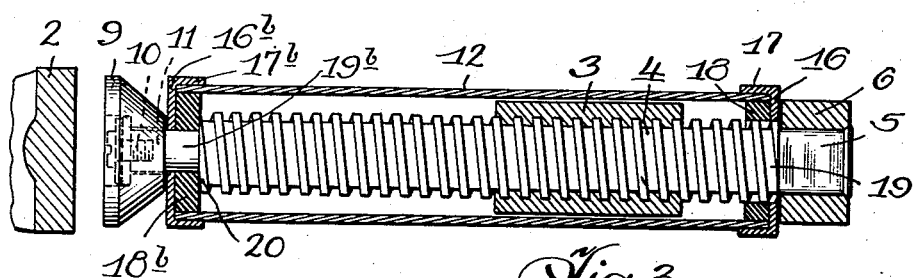
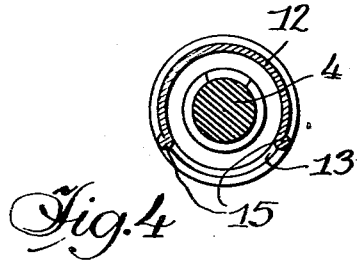
INVENTOR.
Harry V. Holman,
By Louis A. Bisson,
ATTORNEY.

Patented Nov. 12, 1940

2,221,326

UNITED STATES PATENT OFFICE 2,221,326

PROTECTIVE DEVICE FOR CLAMP SCREWS

Harry V. Holman, Chicago, Ill., assignor to Adjustable Clamp Company, Chicago, Ill., a corporation of Illinois Application November 25, 1938, Serial No. 242,314

2 Claims. (Cl. 144—304)

The present invention relates to guards or protective means for operative parts of tools, such as the screw of a clamping device.

When electro-welding, or similarly welding, clamped pieces of work some of the sputterings of molten metal will strike and freeze upon the clamping screw of the clamp, thus rendering it useless. To avoid this condition, guards have been devised to intercept the sputterings and prevent their reaching or contacting the screw or any other operative part of the tool.

In one form of device the guard which is of tubular form with a slot along a side thereof, to partly enclose the screw and the clamp nut in which the screw operates, is built in with the tool so as to become a permanent operative part thereof. One end of the guard is rotatively connected to the handle end of the screw and the other end of the guard constitutes the movable clamping jaw part of the clamp.

In such a structure the work force or power is transmitted through the guard as one of the elements of the power train. That has the disadvantage of buckling under strong force and rendering the tool wholly inoperative and useless, especially when the body of the guard, formed from sheet metal, has been dented or similarly damaged. Should it be desired in such cases to remove the guard, the tool must be destroyed to obtain such result.

An object of the present invention is to provide a novel guard structure which composes an assembly of parts which are readily fitted together and as readily taken apart, and also which may be quickly and easily associated with or dissociated from the operative part of the tool, such as the clamping screw of the clamp, the guard merely being freely supported on or carried by the operative part (such as the screw) when in associated assembly whereby there is no taking part in the clamp function of the tool. The guard only acts to guard against or prevent sputterings or the like having access to the screw or similar operating part or parts. In this way the work force or power is applied by way of the screw in the same manner as it would be effected if the guard were not present.

If in the course of use a weight or the like should be so dropped upon the guard as to dent it to the extent where it would jam or otherwise interfere with the screw or its operation, the body of the guard may be quickly and easily ripped off, thus leaving the clamp free for continued use in its usual way. The end members of the guard left idly on the screw would in no way affect the operation of the tool.

Other objects, advantages, capabilities, features and the like are comprehended by the invention, as will later appear, and as are inherently possessed by the invention.

Referring to the drawing:

Fig. 1 is a view in side elevation of a clamp selected to illustrate the invention and showing the guard means in place;

Fig. 2 is a longitudinal sectional view taken in a vertical plane through the upper part of the device shown in Fig. 1;

Fig. 3 is a horizontal sectional view taken through the same part, but of an alternative form, in a plane represented by line 3—3 of Fig. 1 of the drawing; and Fig. 4 is a transverse sectional view of either form and taken in a plane as represented by line 4—4 of Fig. 1 of the drawing.

Referring more in detail to the drawing, the embodiments chosen to illustrate the invention are shown in connection with a C-type of clamp, but it is to be understood that the invention is applicable to other forms of clamps or similar tools. The clamp shown comprises a body 1 having at one end a stationary or dead clamping jaw 2 and at the other end a nut 3 through which operates a clamping screw 4. To the rear or outer end 5 (which may be polygonal in cross section or otherwise) is secured the hub portion 6 of a hand crank 7 having a handle 8. To the other end of the screw is connected a movable or live clamping jaw 9 by way of a screw 10 threaded into the end of a reduced diameter end portion 11 of the forward or inner end of the screw 4. The rear portion of the jaw 9 may be of frusto-conical form.

The protecting guard or shield comprises an elongated hollow body or shell 12 of sheet or like material (as metal) so bent, curved, or otherwise formed as to mainly partly encompass and house the screw 4 and the nut 3, with an elongated opening 13 along the side of the shell 12 for lateral extension therethrough of the neck 14 from the nut 3 for free longitudinal relative movement of the shell 12 and the neck 14. The edges of the shell 12 at the opening or slot 13 may be rolled or otherwise formed to provide beads or the like 15. While the shell 12 is shown as of circular or arc (C-shape) form in cross section, it will be understood that it may have any cross sectional shape desired, such as polygonal, non-circular, etc.

To the free open ends of the shell 12 are provided end members or portions each of which, in the particular embodiments illustrating the invention, comprises a flanged cap 16, or 16ᵃ or 16ᵇ with the flange 17, or 17ᵃ or 17ᵇ, fitting over the end of the shell 12, as shown, and also comprises plates 18, or 18ᵃ or 18ᵇ (of disc form in the illustrative embodiments shown) which fit into the ends of the shell 12 and normally abut the transverse walls of the caps 16, 16ᵃ and 16ᵇ. In this arrangement there is provided a channel or socket between the flange 17, or 17ᵃ or 17ᵇ, and the perimeter of the plate 18, or 18ᵃ or 18ᵇ, into which the ends of the shell 12 fit.

These end members (16 etc. and 18 etc.) are provided with apertures or openings of such size that the end members may be freely carried about the end portions 19, or 19ᵃ or 19ᵇ of the screw 4 so that the guard as a whole is freely supported on the screw at both ends thereof and functionally free therefrom so that there is no operative force or power transmitted through or along the shell 12. The end member 16—18 is normally located freely adjacent or proximate to the hub 6 of the hand crank, while the member 16ᵃ—18ᵃ, or 16ᵇ—18ᵇ, is normally located freely adjacent or proximate to the rear of the jaw 9.

In the form shown in Fig. 3, the end portion 19ᵇ of the screw 4 is of reduced diameter and the member 16ᵇ—18ᵇ is freely mounted on that portion, and between the shouldered end portion 20 of the screw 4 and the rear end of the jaw 9. The jaw 9 is somewhat loosely mounted on the screw extension 11 so as to afford a small amount of play or angular movement in accommodation to irregularities in the surface of the work being clamped.

In the form shown in Fig. 3, the power will be transmitted from the screw 4 through the member 16ᵇ—18ᵇ, to the jaw 9, but it will be noted that there is no force or power transmitted by way of the shell 12, and, therefore, there is no danger of any buckling of said shell.

In the form shown in Fig. 2, the power is transmitted directly from the screw 4 to the jaw 9, the member 16ᵃ—18ᵃ merely freely resting upon the end portion 19ᵃ of the screw 4. In this form also the inner edge of the hole in the cap 16ᵃ is preferably in contact with the frusto-conical part of the jaw 9 so as to prevent the projection of any of the metal sputterings into the space between the rear end of the jaw 9 and the shouldered forward end of the screw 4.

When the screw 4 is operated to effect clamping it has a longitudinal or axial movement. The guard also has a like movement since it is carried by the screw. In the form shown in Fig. 2, the hub 6 of the crank handle may merely push the guard forward but it will not transmit any force or power through or along the shell 12. In the form shown in Fig. 3, because of the screw acting through the end member 16ᵇ—18ᵇ, the guard may be merely pulled along without any force or power being effected by way of the shell 12. If the forward end of the shell 12 does not fit tightly in the end member 16ᵇ—18ᵇ, then the hub 6 of the crank shaft may merely push the guard (shell 12 and end member 16—18) along.

When unclamping, the longitudinal movements of the screw 4 and guard are in the reverse direction, the jaw 9 acting to merely push the guard along.

To assemble the guard and apply it to the tool, the plate 18 is inserted into the end of the shell, and the cap 16 put in place over the end of the shell. The screw 4, from which jaw 9 has been disconnected and which has been worked back out of the nut 3, is then inserted through end member 16—18. Then the screw is reinserted in the nut 3 with the shell sliding about the nut 3. Then the end member 16ᵃ—18ᵃ, or 16ᵇ—18ᵇ, is fitted to the inner end of the shell, much in the same way the other or outer end member was fitted to the outer end of the shell. Then the jaw 9 is connected to the end portion 11 of the screw 4.

Should the shell be damaged, as by a weight falling on it so as to so dent or bend it as to make it impossible to slide over the nut 3, then the shell may be easily ripped out. This may be done by inserting the end of a tool, such as screw driver, chisel, or even a crowbar, in between the edge of the opening 13 in the shell and the nut 3, and by prying up so as to outwardly bend or bow the shell. This will effect a pulling out of the ends of the shell from the end members, and continued application of lever force will eventually result in a complete ripping out of the shell. That will leave the end members idle and free on the screw, and the tool in condition for use in the usual way without the use of the guard, until the workman later has the time to disconnect the jaw 9, remove the screw 4 from the nut 3, and also remove the loose end members, at which time a new guard may be applied as above explained.

While I have herein described and upon the drawing shown a few embodiments of the invention, it is to be understood that the invention is not limited thereto but comprehends other constructions, arrangements of parts, details, features, or the like without departing from the spirit of the invention.

Having thus disclosed the invention, I claim as my invention:

1. In a clamping device having a nut, a clamping screw operative in said nut, a handle secured to an end of the screw, and a clamping jaw connected to the other end of the screw; a guard comprising an elongated hollow body of such form as to mainly surround the screw and the nut, end members fitted to the ends of said body and freely supported on end portions of the screw and located freely adjacent to said handle and to said clamping jaw respectively, each of said end members comprising a cap having a flange fitting over the end of the body, and a plate fitting within the end of the body and within and concentric with said cap, said cap and plate being provided with holes of such size that said end member fits freely about an end portion of the screw.

2. A guard of the character disclosed comprising a tubular body portion provided with an elongated opening at one side thereof, readily attachable and detachable end members fitted to the ends of said tubular body member and being provided with holes of such size that said end members may freely surround spaced operative parts of the device to be guarded, each of said end members comprising a flanged element fitting over the end of the tubular body portion, and an apertured disc fitting within said end of the tubular body member and adjacent to said element.

HARRY V. HOLMAN.